United States Patent
Okin

(10) Patent No.: US 6,799,285 B2
(45) Date of Patent: Sep. 28, 2004

(54) SELF-CHECKING MULTI-THREADED PROCESSOR

(75) Inventor: Kenneth A. Okin, Saratoga, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 633 days.

(21) Appl. No.: 09/812,125

(22) Filed: Mar. 19, 2001

(65) Prior Publication Data

US 2002/0133745 A1 Sep. 19, 2002

(51) Int. Cl.[7] ............................................. G06F 11/30
(52) U.S. Cl. .......................... 714/37; 714/38; 714/49
(58) Field of Search ............................ 714/30, 31, 37, 714/38, 49, 797

(56) References Cited

U.S. PATENT DOCUMENTS

| | | | |
|---|---|---|---|
| 4,873,685 A | * 10/1989 | Millis, Jr. | ............ 714/797 |
| 5,361,337 A | 11/1994 | Okin | ............ 395/375 |
| 6,141,770 A | * 10/2000 | Fuchs et al. | ............ 714/11 |
| 6,523,139 B1 | * 2/2003 | Banning et al. | ............ 714/43 |
| 2001/0034854 A1 | * 10/2001 | Mukherjee | ............ 714/5 |
| 2002/0133751 A1 | * 9/2002 | Nair et al. | ............ 714/38 |

* cited by examiner

Primary Examiner—Scott Baderman
(74) Attorney, Agent, or Firm—Osha & May L.L.P.

(57) ABSTRACT

A method and apparatus for a self-checking multi-threaded processor includes a first thread for generating a first I/O request; a second thread for generating a second I/O request; and a self-checking component for comparing the first I/O request and second I/O request. Processor operation is selectively suspended based on the comparison of the first I/O request and the second I/O request. The self-checking multi-threaded processor may include a third thread for generating a third I/O request; the self-checking component may compare the I/O requests of the first thread, the second thread, and the third thread; and processor operation may selectively continue with issuance if at least two the first I/O request, the second I/O request, and the third I/O request match. The second thread may begin processing to generate the second I/O request upon the generation of the first I/O request by the first thread. The second thread may selectively continue processing using data requested by the first I/O request based on the comparison of the first I/O request and the second I/O request and then the first thread may begin processing to generate another first I/O request upon generation of another second I/O request by the second thread. The first I/O request may be issued prior to the second thread beginning processing to generate the second I/O request. The I/O request may be a read operation.

21 Claims, 9 Drawing Sheets

SELF-CHECKING MULTI-THREADED PROCESSOR

BACKGROUND OF THE INVENTION

Computer processors comprise arithmetic, logic, and control circuitry that interpret and execute instructions from a computer program. Referring to FIG. 1, a typical computer system includes a microprocessor (22) having, among other things, a CPU (24), a system controller (26), and an on-chip cache memory (30). The microprocessor (22) is connected to external cache memory (32) and a main memory (34) that both hold data and program instructions to be executed by the microprocessor (22). Internally, the execution of program instructions is carried out by the CPU (24). Data needed by the CPU (24) to carry out an instruction are fetched by the memory controller (26) and loaded into internal registers (28) of the CPU (24). Upon command from the CPU (24) requiring memory data, the fast on-chip cache memory (30) is searched. If the data is not found, then the external cache memory (32) and the slow main memory (34) is searched in turn using the memory controller (26). Finding the data in the cache memory is referred to as a "hit." Not finding the data in the cache memory is referred to as a "miss."

The time between when a CPU requests data and when the data is retrieved and available for use by the CPU is termed the "latency" of the system. If requested data is found in cache memory, i.e., a data hit occurs, the requested data can be accessed at the speed of the cache and the latency of the system is reduced. If, on the other hand, the data is not found in cache, i.e., a data miss occurs, and thus the data must be retrieved from the external cache or the main memory at increased latencies.

There are suitable devices for protecting memory areas in processors and for caching unmodified data. These devices allow data in the system to be protected from corruption if a data bit changes due to a cosmic event. In such a case, the processor either recovers or declares an unrecoverable event.

In computer systems, information is represented in binary format (1's and 0's). When binary information is passed from one point to another, there is a chance that a mistake can be made, e.g., a 1 interpreted as a 0 or a 0 interpreted as a 1. This can be caused by, system events, media defects, electronic noise, component failures, poor connections, deterioration due to age, and other factors. When data is mistakenly interpreted, an error has occurred.

It is normal for a computer system to encounter errors during system requests, e.g., reading and writing data, as part of its regular operation. As computer systems improve, tracks, sectors, and other memory locations are spaced closer together, signals used to prevent interference get weaker, and spin rates produced by a spindle motor get faster. These effects increase the likelihood of errors occurring when system requests are issued. However, having actual errors appear to a user while using a computer system is not desirable. Therefore, computer systems incorporate special techniques that allow them to detect and correct errors.

One type of error detection and correction in computer systems is through the inclusion of redundant information and special hardware or software to use it. Typically, a sector of data on a hard disk contains 512 bytes, or 4,096 bits, of user data. In addition to these bits, an additional number of bits are added to each sector for the implementation of error correcting code or ECC (sometimes also called error correction code or error correcting circuits). These bits do not contain data; rather, they contain information about the data that can be used to correct problems encountered trying to access the real data bits.

Further, the inclusion of self-checking circuitry for error detection is used. In such a case, the self-checking circuitry monitors the results of system requests to detect correctness cycle by cycle. In this approach, at least one location is designated in hardware that is responsible for comparing executing processes cycle by cycle. In other words, self-checking circuitry not only checks results of system requests from processes, but also compares the processes as they execute.

Another type of error detection in computer systems is the use of multiple processors that operate in a lock-step configuration. Such processors execute identical segments of a program and then compare their results to determine whether or not an error has occurred.

Multi-threaded processors exist such that when functions performed by a given thread in a processor come to a halt, e.g., when awaiting data to be returned from main memory after a read operation, the processor can perform other functions on a different thread in the meantime. These processors embody the ability to instantaneously switch execution flow, for example, from a Thread A to a Thread B, when Thread A is blocked from execution. As mentioned above, most often execution is blocked by waiting for an input-output (I/O) operation (typically, a read operation) to complete.

SUMMARY OF THE INVENTION

In general, in one aspect, the present invention is a self-checking multi-threaded processor comprising a first thread for generating a first I/O request; a second thread for generating a second I/O request; and a self-checking component for comparing the first I/O request and second I/O request. Processor operation is selectively suspended based on the comparison of the first I/O request and the second I/O request.

In general, in one aspect, the present invention is a method of self-checking multi-threaded processors, comprising processing code on a first thread to generate a first I/O request; processing the code on a second thread to generate a second I/O request; comparing the first I/O request and the second I/O request; and selectively suspending processor operation based on the comparison of the first I/O request and the second I/O request.

In general, in one aspect, the present invention is a self-checking apparatus comprising a first I/O request generating means; a second I/O request generating means; comparison means for comparing the first I/O request and the second I/O request; and processor operation suspension means for selectively suspending processor operation based on the comparison of the first I/O request and the second I/O request.

In general, in one aspect, the present invention is a method of self-checking multi-threaded processors comprising generating an I/O request on a Thread A; generating an I/O request on a Thread B; comparing the Thread A I/O request and the Thread B I/O request; suspending processor operation if the Thread A I/O request and the Thread B I/O request are different; and alternating between generating the I/O request on Thread A first and generating the I/O request on Thread B first when the processor operation is not suspended.

In general, in one aspect, the present invention is a method of self-checking multi-threaded processors comprising executing code on a Thread A until an I/O request generating event occurs; issuing the I/O request if the I/O request is a read operation; executing the code on a Thread B until an I/O request generating event occurs; comparing the I/O request generated by Thread B and the I/O request generated by Thread A; and suspending processor operation if the I/O request generated by Thread B and the I/O request generated by Thread A are different.

In general, in one aspect, the present invention is a method of self-checking multi-threaded processors comprising generating an I/O request on a Thread A; generating an I/O request on a Thread B; using the Thread B I/O request to confirm the Thread A I/O request; and suspending processor operation if the Thread A I/O request and the Thread B I/O request are different. Other aspects and advantages of the invention will be apparent from the following description and the appended claims.

DETAILED DESCRIPTION

Figure 1:
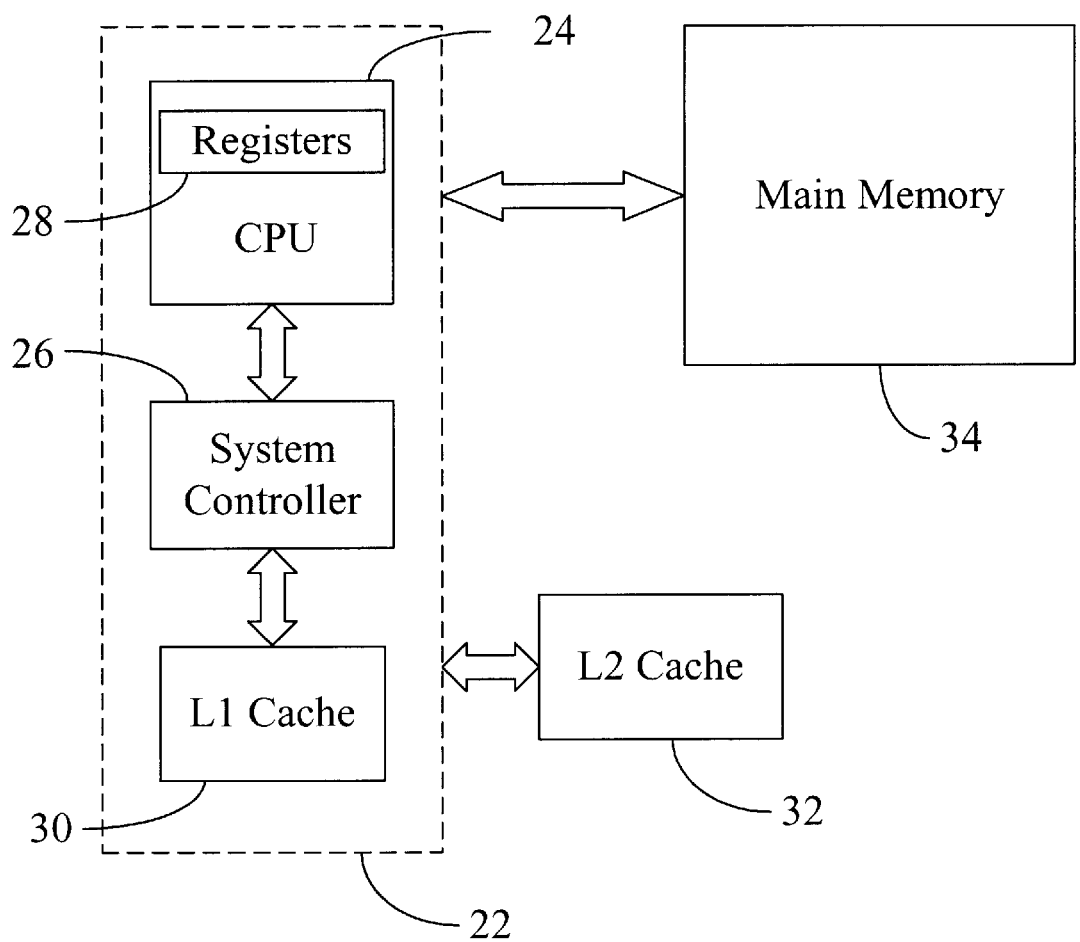
FIG. 1 shows a typical computer system.
Figure 2:
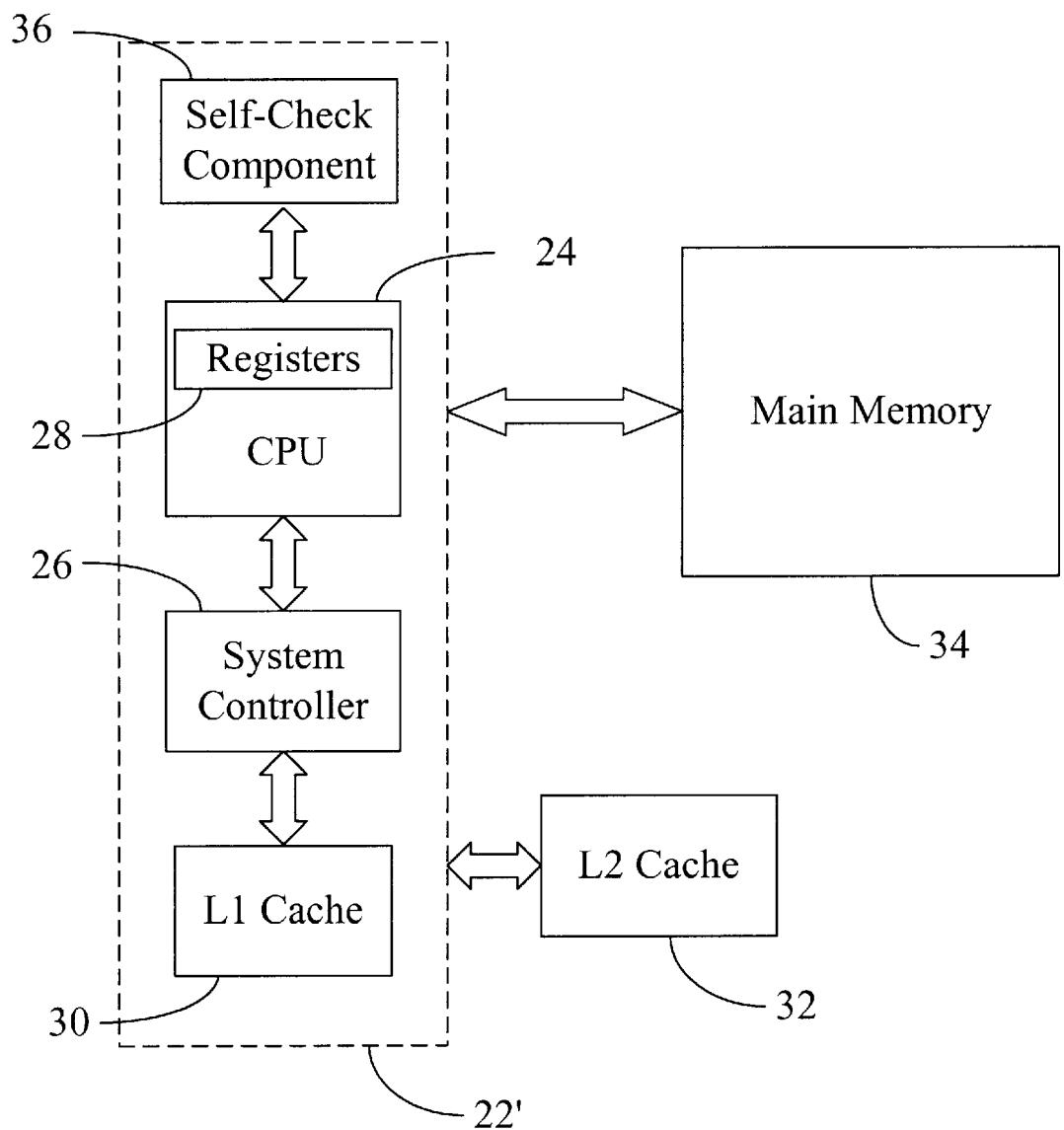
FIG. 2 is a block diagram in accordance with an embodiment of the present invention

In one or more embodiments, the present invention involves an apparatus and method that allows self-checking in a multi-threaded processor. Referring to the drawings wherein like reference characters are used for like parts throughout the several views, FIG. 2 shows a block diagram of a system in accordance with an embodiment of the present invention.

The system includes a multi-threaded processor (22') that has architecture defined to guarantee uncorrupted delivery of addresses and data from the processor to the bus interface. The processor includes self-checking component (36) that operates as described below. In one or more embodiments, the self-checking component (36) may be a register designated to control and compare the internal threads of the processor. In one or more embodiments, the self-checking component (36) may be separate circuitry, internal or external to the processor, for controlling and comparing the internal threads of the processor. Further, the self-checking component (36) may reside outside the processor, for instance, in the bus interface between the processor and the system.

Figure 3:
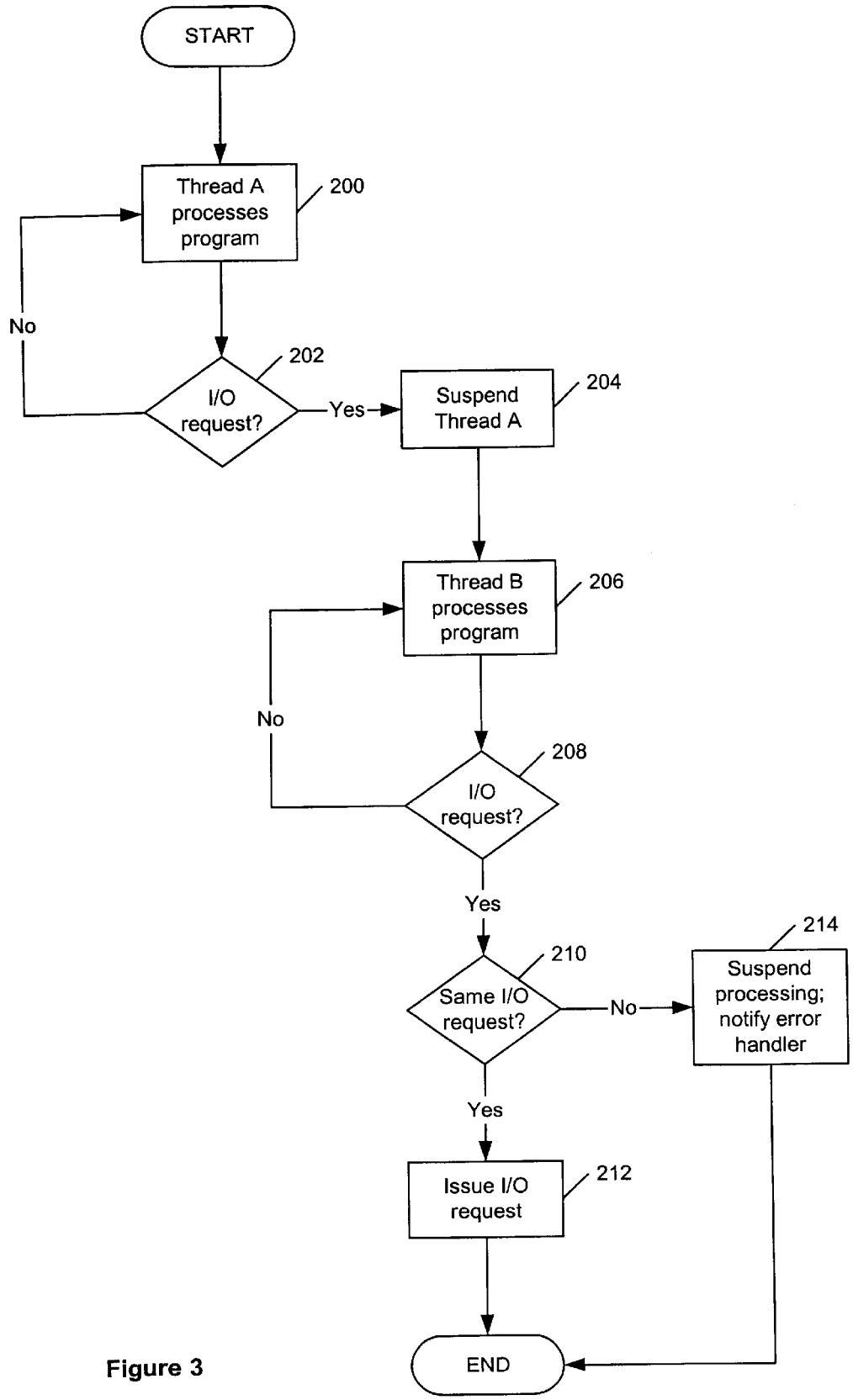
FIG. 3 is a flow chart showing an exemplary process in accordance with an embodiment of the present invention.

FIG. 3 is a flow chart showing an exemplary self-checking operation. Generally, the process involves starting in series both Thread A and Thread B at the same program location. The starts are separated temporally by the time between the beginning of execution and an I/O request generating event. For example, if Thread A begins execution, at some point in time, Thread A issues a read or write request external to the processor. At that point, Thread A is blocked and Thread B begins processing the same instructions that Thread A just processed. At some point in time thereafter, Thread B issues the same I/O request, if all the internal circuitry is performing properly. That is, there has been no effects on the processor by cosmic event, internal noise, or other defect. Once both threads have confirmed the same I/O request, the I/O request is issued externally. Thus, any I/O request issued is free of transient events and the decision areas of the processor have been verified to have acted consistently.

Referring directly to the exemplary flow shown in FIG. 3, Thread A processes the program (step 200) until an I/O request is generated (step 202). Upon generation of the I/O request, Thread A is suspended (step 204) and Thread B processes the same section of the program (Step 206). When Thread B reaches the point at which Thread A generated an I/O request, if all processor components are properly functioning, Thread B will generate an identical I/O request (step 208). Upon generation of the I/O request by Thread B (step 208), the self-checking component compares the I/O requests generated by Thread A and Thread B (step 210). If the I/O requests are the same (step 210), the I/O request has been verified as error-free and can be issued externally (step 212). On the other hand, if the I/O requests do not match (step 210), it is clear that some intervening event caused an inconsistency. Thus, processing is suspended (step 214) and remedial action is taken. Dependent on circumstance, the remedial action may be reprocessing the program, returning an error, or the like.

Figure 4:
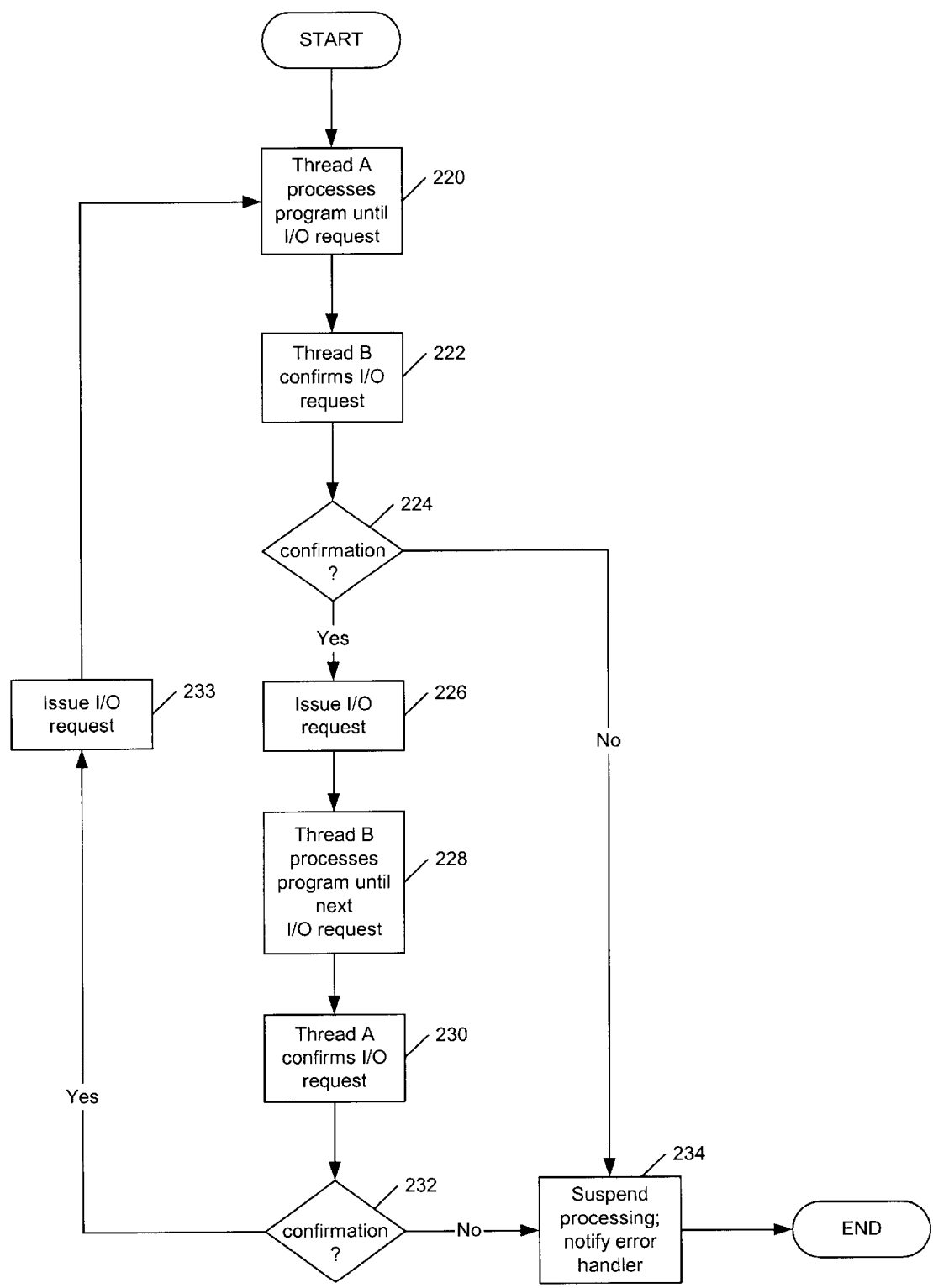
FIG. 4 is a flow chart showing an exemplary active thread switching process in accordance with an embodiment of the present invention.

In one or more embodiments, the system uses Thread A and Thread B in alternative operation. Referring to FIG. 4, in such a situation, Thread A is initially processing code and reaches an I/O request generating event (step 220). Then, Thread B is run to confirm the processing just completed by Thread A (step 222). After confirmation (step 224) and issuance of the request (step 226), Thread B remains the active thread in the processor. Thus, when the requested data is returned, Thread B uses the data to continue processing until another I/O request is reached (step 228). At that point, Thread A is used to confirm the processing completed by Thread B since the last I/O request (step 230). As with Thread B before, if confirmation occurs (step 232), the I/O request issues (step 233) and Thread A remains the active thread in the processor. In this fashion, Thread A and Thread B alternatively confirm the processing of the other. This allows data to be furnished to the active thread within the processor. Each thread continues to actively process data until an I/O request is generated. The process continues until either the program is completely executed or confirmation fails at step 224 or step 232. In the case of confirmation failure, processing is suspended (step 234) and the system may dynamically handle the error or operate in a predefined manner.

Figure 5:
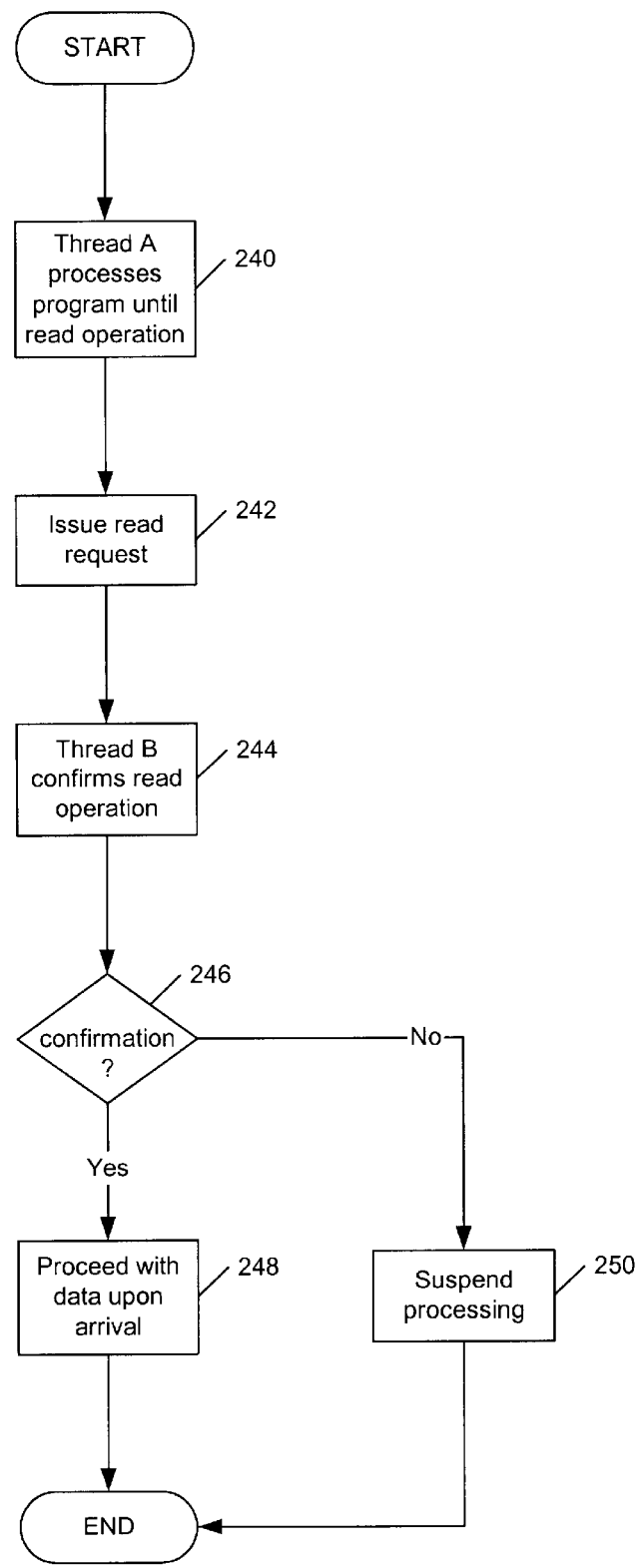
FIG. 5 is a flow chart showing an exemplary read operation handling process in accordance with an embodiment of the present invention.

Referring to FIG. 5, in one or more embodiments, processing speed can be improved in cases where the I/O request is a read operation. In such cases, due to the latency associated with read operations, the I/O request can be made immediately to the external system for read requests where the act of the read does not change the contents of the data returned. This is because the confirmation of the process by the secondary thread completes prior to the return of the information requested. Thus, confirmation occurs prior to receipt of the data requested and upon arrival of the data, proper handling can occur. As shown in the exemplary flow diagram, Thread A processes a program until a read operation is reached (step 240). The read request is immediately issued externally (step 242). Then, Thread B confirms the read operation (step 244) and, if positively confirmed (step 246), the processing proceeds with the requested data upon arrival (step 248). Otherwise, processing is suspended (step 250) and when the errantly requested data reaches the processor, no further processing occurs. Thus, the internal processing confirmation is hidden within the read latency.

Figure 6:
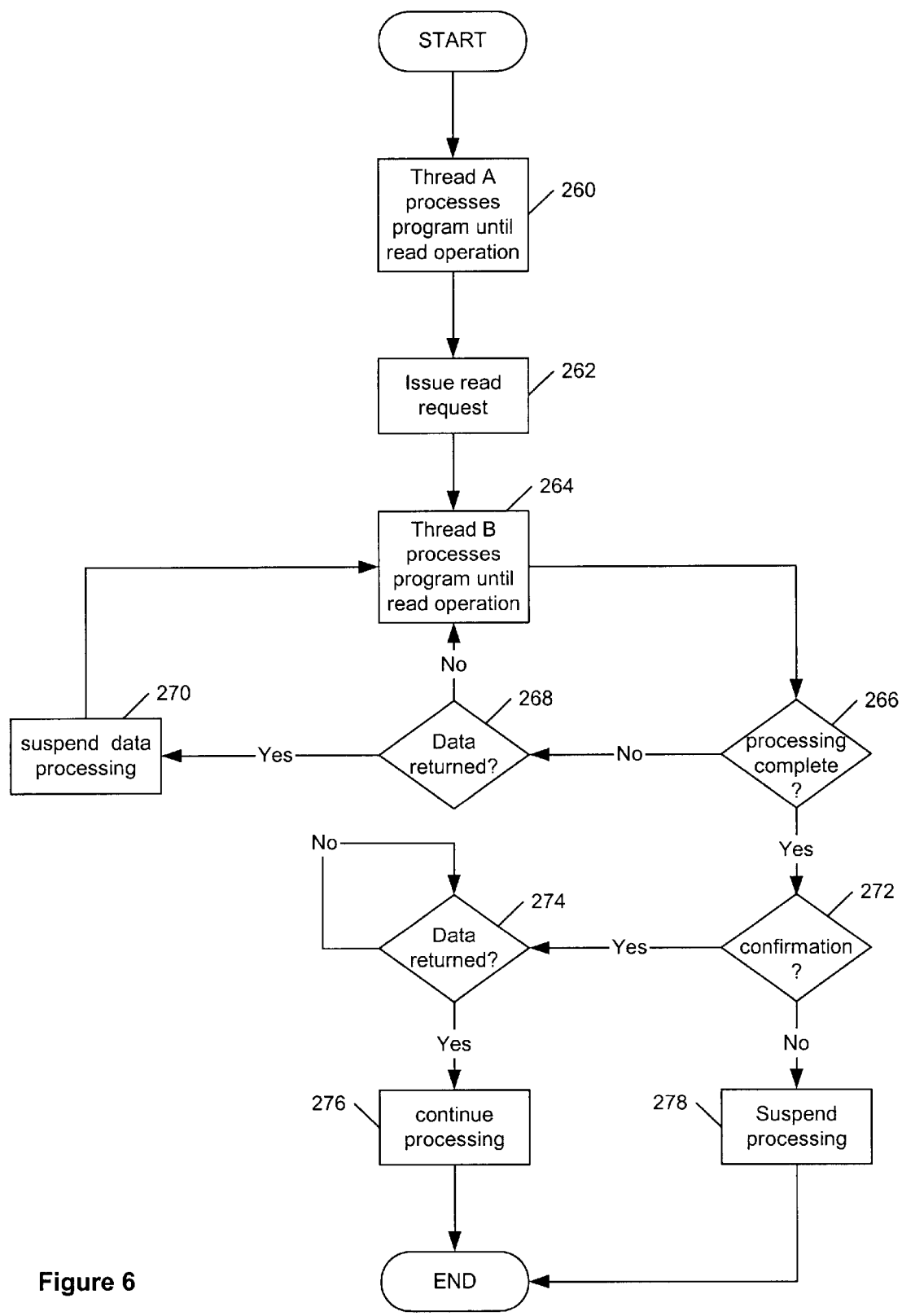
FIG. 6 is a flow chart showing an exemplary read operation handling process in accordance with an embodiment of the present invention.

In one or more embodiments, the system may be designed to handle a situation that may involve receiving requested data prior to completion of confirmation. Referring to FIG. 6, in a case where the data is received more quickly than the confirmation, the usage of the data received can be suspended until confirmation is complete. As can be seen, Thread A processes the program until a read operation is reached (step 260). The read request is immediately issued (step 262) and the confirmation processing of Thread B commences (step 264). Until the confirmation processing is complete (step 266), the system monitors whether the requested data has been returned (step 268). If so, the processing of that returned data is suspended until confirmation is complete (step 270). Otherwise, the system continues to monitor and process until either the confirmation processing completes (step 266) or the requested data is returned (step 268).

Upon completion of the confirmation processing, the self-check component (36) determines whether confirmation has positively occurred (step 272). If so, the system checks for the requested data (step 274). If the data has already been returned (step 274), processing continues using the data (step 276). If the data has not yet been returned (step 274), the system continues processing upon reception. In the event that positive confirmation fails (step 272), as before processing is suspended (step 278) and remedial action may be implemented.

Thus, if the I/O operation started by the Thread A is a read, the read is issued to the system immediately. Then, Thread B is run with the same code to confirm the accuracy of the read operation. In most cases, Thread B confirms the read operation faster than the read operation can complete. Accordingly, when the requested data arrives, processing simply continues. On the other hand, in a case where the requested information is received prior to confirmation, further processing of that received data is suspended until confirmation occurs. In such a situation, the system latency is only increased by the difference between the time taken by Thread B to processes the code and the time required to retrieve the requested data. In either case, only accurate operations are continued and, at the same time, latency is kept to a minimum. Those skilled in the art will appreciate that flow shown is in accordance with the embodiment shown in FIG. 5 when the delay associated with step 248 is zero.

Figure 7:
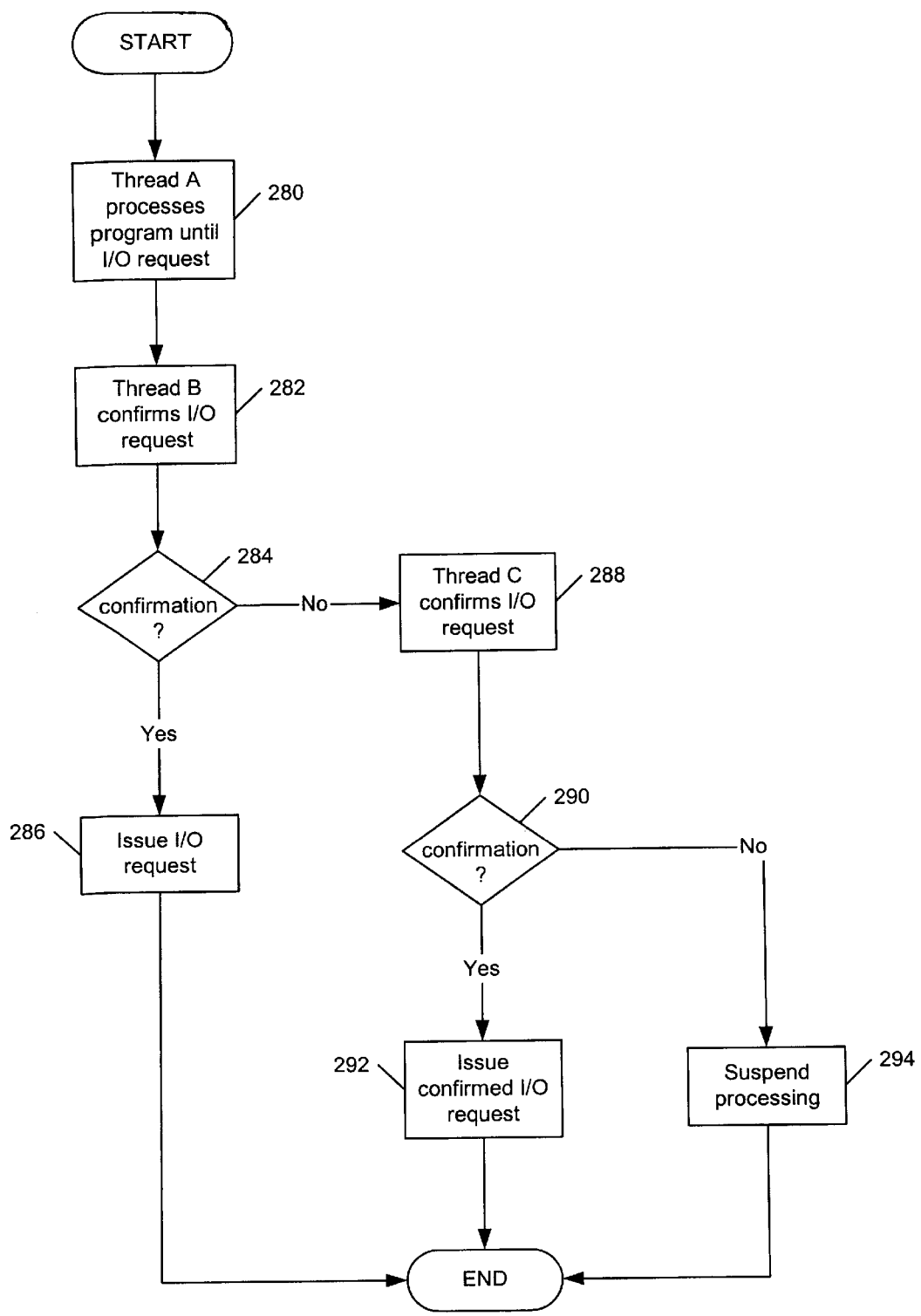
FIG. 7 is a flow chart showing an exemplary multi-thread process in accordance with an embodiment of the present invention.

In one or more embodiments, the system may include three or more threads. In such a case, non-stop processing can occur. That is, the self-checking component compares the I/O requests generated by the three or more threads and can, from the comparison, determine a error-free I/O request. In the case of three threads, if a disparity exists among one of the threads with the other two, the error-free I/O request can be selected as the I/O request reached by two of the threads. Referring to FIG. 7, Thread A processes a program until reaching an I/O request generating event (step 280). Then, Thread B is run to confirm the I/O request (step 282). If the confirmation is positive (step 284), the I/O request can be issued (step 286). On the other hand, if a discrepancy exists between the I/O request generated by Thread A and Thread B, Thread C is run to confirm which I/O request is error-free (step 288). If Thread C confirms either Thread A or Thread B was error-free by reaching the same I/O request (step 290), the confirmed I/O request is issued (step 292). Otherwise, if all three threads arrived at different I/O requests (step 290), processing is suspended (step 294). Those skilled in the art will appreciate that this process can be extrapolated to as many threads as desired.

Figure 8:
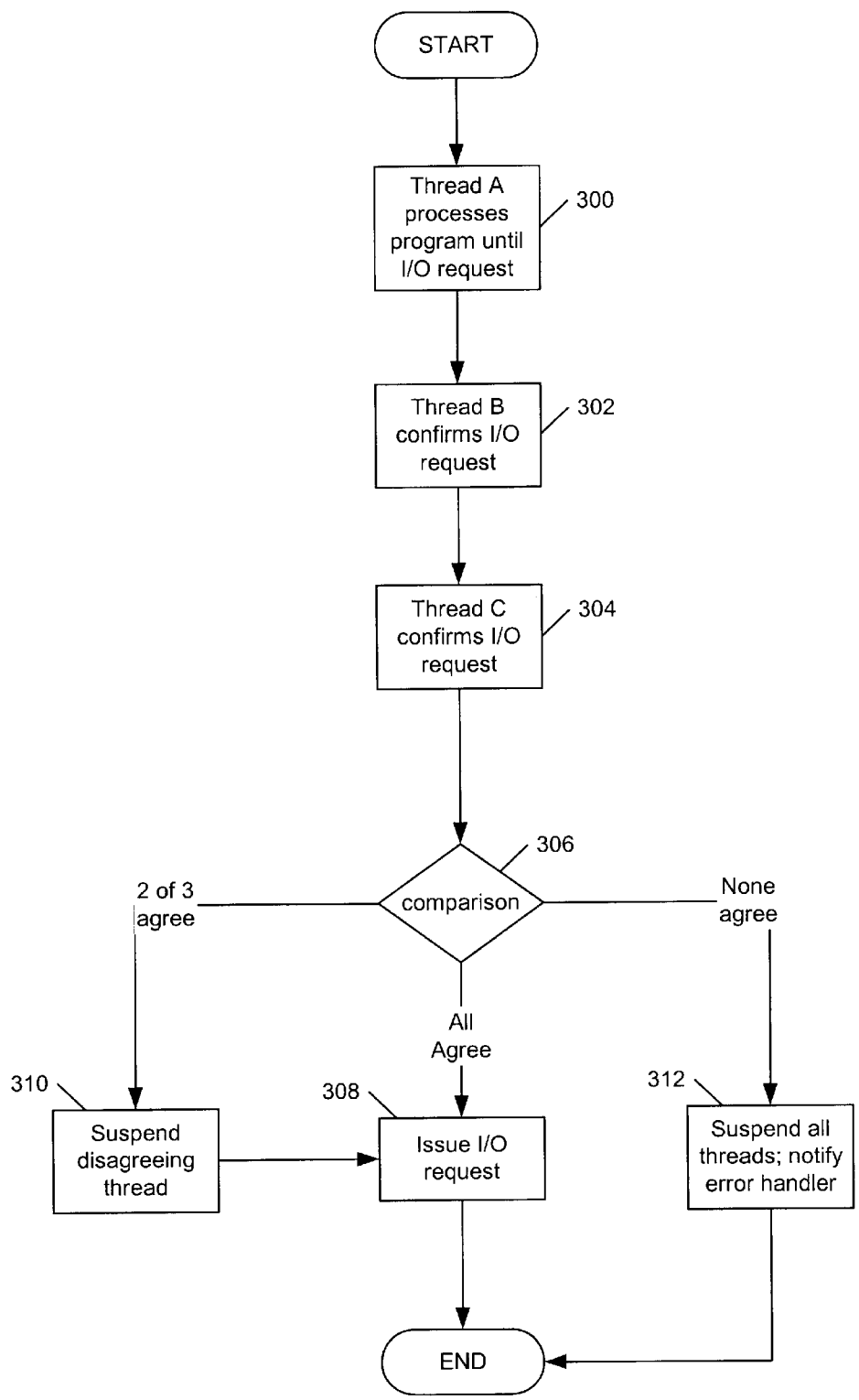
FIG. 8 is a flow chart showing an exemplary multi-thread process in accordance with an embodiment of the present invention.

In one or more embodiments, when the system includes three or more threads, the process may proceed by comparing all thread outcomes. In such a case, non-stop processing can occur. Referring to FIG. 8, Thread A processes a program until reaching an I/O request generating event (step 300). Then, Thread B (step 302) and Thread C (step 304) are run to confirm the I/O request. When I/O requests are generated by Thread B and Thread C, the system compares the I/O requests of the three threads (step 306).

If all three threads agree (step 306), the I/O request is confirmed and can be issued. Upon issuing the I/O request (step 308), the process ends. If two of the three threads agree (step 306), then the I/O request is confirmed by two threads and can be issued. Additionally, one of the threads, i.e., the disagreeing thread, has encountered some type of error-causing event. Thus, the disagreeing thread is suspended (step 310), the I/O request is issued (step 308), and the process ends. If none of the threads agree (step 306), errors have been encountered by at least two threads and no confirmation can be obtained. Thus, all processing is suspended and the error handler is notified (step 312), which ends the process.

Figure 9:
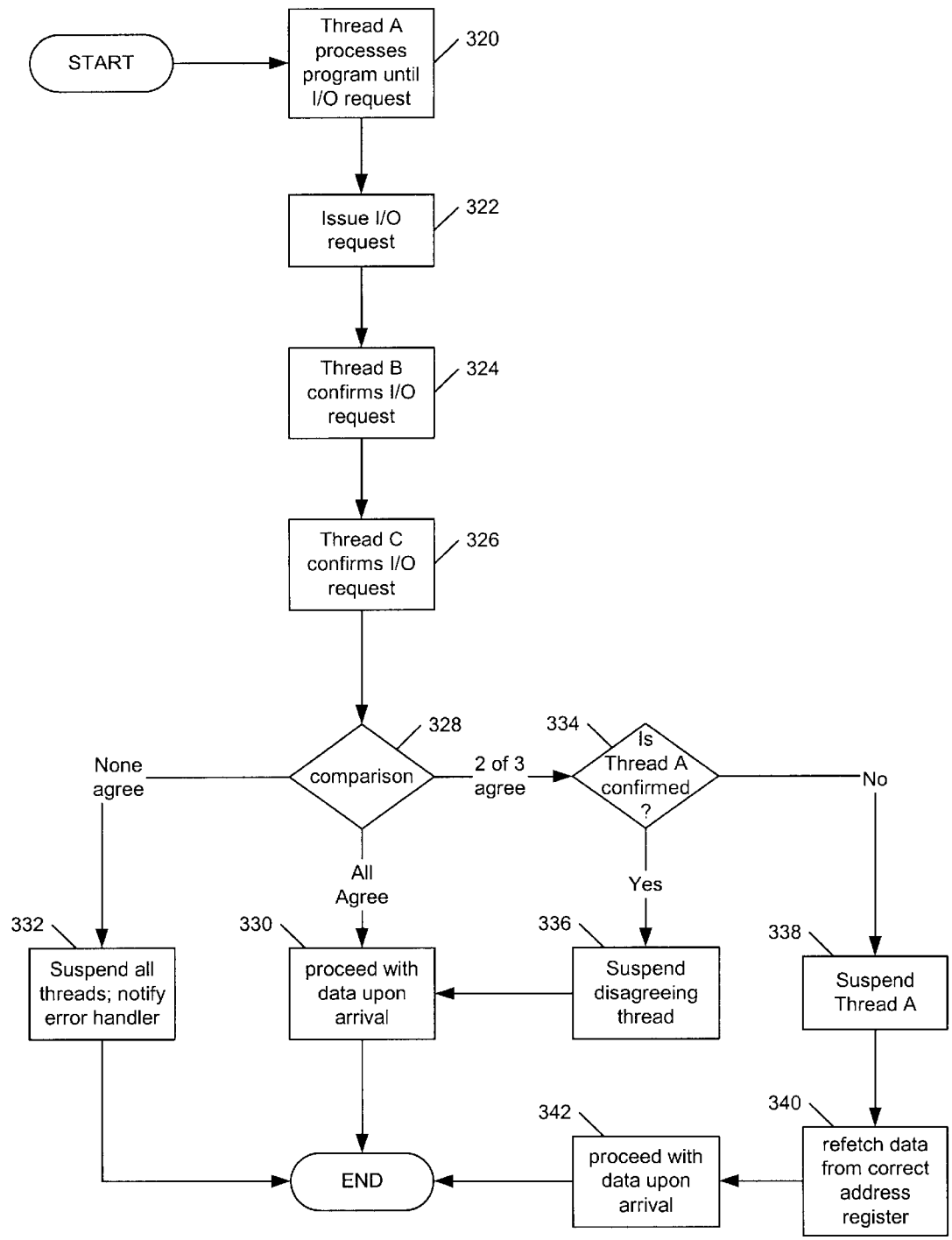
FIG. 9 is a flow chart showing an exemplary multi-thread process in accordance with an embodiment of the present invention.

In one or more embodiments, when the system includes three or more threads, processing speed can be improved in cases where the I/O request is a read operation. In such a case, potentially faster non-stop processing can occur. Referring to FIG. 9, Thread A processes a program until reaching an I/O request generating event (step 320). The read request is immediately issued externally (step 322). Then, Thread B (step 324) and Thread C (step 326) are run to confirm the I/O request. When I/O requests are generated by Thread B and Thread C, the system compares the I/O requests of the three threads (step 328).

If all three threads agree (step 328), the issued request is confirmed and the system can proceed with the data upon arrival (step 330). On the other hand, if none of the three threads agree (step 328), an error has been encountered by at least two of the threads and the issued request cannot be confirmed. Thus, all processing is suspended and the error handler is notified (step 332). Either case ends the process.

Alternatively, if two of the three threads agree (step 328), the system determines if Thread A is one of the two threads in agreement (step 334). If so, the issued request is confirmed. Also, one of the threads, i.e., the disagreeing thread, has encountered an error. Thus, the disagreeing thread is suspended (step 336), the system proceeds with the data upon arrival (step 330), and the process ends. However, if Thread A is not one of the agreeing two threads (step 334), the wrong data has been prefetched by the initial I/O request (step 322). Further, Thread A has encountered an error-causing event. Thus, Thread A is suspended (step 338), the confirmed I/O request is issued (step 340), and the system proceeds with the newly requested data upon arrival (step 342), which ends the process.

Advantages of the present invention may include one or more of the following. In one or more embodiments, the disclosed system allows accurate processing and avoidance of errors due to cosmic events without introducing complex additional hardware or latency to existing multi-threaded processors. Other control techniques can be included to further increase performance. For instance, the I/O request could be either issued or suspended depending on whether the request accesses L2 cache or main memory. Further, exemplary embodiments disclosed herein may be combined in any of a plurality of ways depending on the implementation requirements. Those skilled in the art will also appreciate that although the processes described above refer to one set of threads, the same process can be applied to a plurality of sets of threads running in parallel.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A self-checking multi-threaded processor comprising:
   a first thread for generating a first I/O request, wherein the first thread is at least temporarily suspended upon generation of the first I/O request and before the first I/O request is issued externally;
   a second thread for generating a second I/O request; and
   a self-checking component for comparing the first I/O request and second I/O request;
   wherein processor operation is selectively suspended based on the comparison of the first I/O request and the second I/O request.

2. The self-checking multi-threaded processor of claim 1 further comprising:
   a third thread for generating a third I/O request;
   wherein self-checking component compares the I/O requests of the first thread, the second thread, and the third thread; and
   wherein processor operation selectively continues with issuance if at least two the first I/O request, the second I/O request, and the third I/O request match.

3. The self-checking multi-threaded processor of claim 1, wherein the second thread begins processing to generate the second I/O request upon the generation of the first 110 request by the first thread.

4. The self-checking multi-threaded processor of claim 3, wherein the second thread selectively continues processing using data requested by the first I/O request based on the comparison of the first I/O request and the second I/O request.

5. The self-checking multi-threaded processor of claim 4, wherein the first thread begins processing to generate another first I/O request upon generation of another second I/O request by the second thread.

6. The self-checking multi-threaded processor of claim 3, wherein the first I/O request is issued prior to the second thread beginning processing to generate the second I/O request.

7. The self-checking multi-threaded processor of claim 6, wherein the I/O request is a read operation.

8. A method of self-checking multi-threaded processors, comprising:
   processing code on a first thread to generate a first I/O request, wherein the first thread is at least temporarily suspended upon generation of the first I/O request and before the first I/O request is issued exturnally;
   processing the code on a second thread to generate a second I/O request;
   comparing the first I/O request and the second I/O request; and
   selectively suspending processor operation based on the comparison of the first I/O request and the second I/O request.

9. The method of claim 8, further comprising:
   processing the code on a third thread to generate a third I/O request;
   comparing the third I/O request to the first I/O request and the second I/O request; and
   selectively issuing one of the first I/O request, the second I/O request, and the third I/O request based on the comparison of the first I/O request, second I/O request, and third I/O request.

10. The method of claim 8, further comprising:
    processing the code on the second thread upon generation of the first I/O request.

11. The method of claim 10, further comprising:
    selectively continuing processing code on the second thread using the data requested by the first I/O request based on the comparison of the first I/O request and the second I/O request.

12. The method of claim 10, further comprising:
    issuing the first I/O request prior to processing of the code on the second thread.

13. The method of claim 12, wherein the I/O request is a read operation.

14. A self-checking apparatus comprising:
    a first I/O request generating means, wherein the first I/O request generating means is at least temporarily suspended upon generation of the first I/O request and before the first I/O request is issued externally;
    a second I/O request generating means;
    comparison means for comparing the first I/O request and the second I/O request; and
    processor operation suspension means for selectively suspending processor operation based on the comparison of the first I/O request and the second I/O request.

15. The apparatus of claim 14 further comprising:
    a third I/O request generating means;
    wherein the comparison means compares the third I/O request to the first I/O request and the second I/O request; and
    wherein one of the first I/O request, the second I/O request, and the third I/O request is selectively issued based on the comparison of the first I/O request, second I/O request, and third I/O request.

16. The apparatus of claim 14 wherein the second I/O request generating means begins generating a second I/O request upon the generation of the first I/O request.

17. A method of self-checking multi-threaded processors comprising:
    generating an I/O request on a Thread A;
    generating an I/O request on a Thread B;
    comparing the Thread A I/O request and the Thread B I/O request;

suspending processor operation if the Thread A I/O request and the Thread B I/O request are different; and alternating between generating the I/O request on Thread A first and generating the I/O request on Thread B first when the processor operation is not suspended.

18. The method of claim 17, further comprising:

issuing the first generated I/O request prior to beginning the second I/O request generation.

19. The method of claim 18, wherein the first generated I/O request is a read operation.

20. A method of self-checking multi-threaded processors comprising:

executing code on a Thread A until an I/O request generating event occurs, wherein Thread A is at least temporarily suspended upon the occurrence of the I/O request generated by Thread A and before the I/O request generated by Thread A is issued externally;

issuing the I/O request if the I/O request is a read operation;

executing the code on a Thread B until an I/O request generating event occurs;

comparing the I/O request generated by Thread B and the I/O request generated by Thread A; and suspending processor operation if the I/O request generated by Thread B and the I/O request generated by Thread A are different.

21. A method of self-checking multi-threaded processors comprising:

generating an I/O request on a Thread A, wherein Thread A is at least temporarily suspended upon generation of the Thread A I/O request and before the Thread A I/O request is issued externally;

generating an I/O request on a Thread B;

using the Thread B I/O request to confirm the Thread A I/O request; and suspending processor operation if the Thread A I/O request and the Thread B I/O request are different.

* * * * *

UNITED STATES PATENT AND TRADEMARK OFFICE
CERTIFICATE OF CORRECTION

PATENT NO. : 6,799,285 B2
DATED : September 28, 2004
INVENTOR(S) : Kenneth A. Okin It is certified that error appears in the above-identified patent and that said Letters Patent is hereby corrected as shown below:

Column 7,
Line 50, please replace "110" with -- I/0 --.

Column 8,
Line 6, please replace the word "exturnally" with -- externally --.

Signed and Sealed this

Eleventh Day of January, 2005

JON W. DUDAS
*Director of the United States Patent and Trademark Office*